United States Patent [19]

Wallace et al.

[11] 4,267,747

[45] May 19, 1981

[54] SAFETY LEVER

[75] Inventors: William K. Wallace, Barneveld; David A. Giardino, Deerfield; Gerrit van Nederynen, Frankfort, all of N.Y.

[73] Assignee: Chicago Pneumatic Tool Company, New York, N.Y.

[21] Appl. No.: 33,467

[22] Filed: Apr. 26, 1979

[51] Int. Cl.³ .............................................. G05G 9/04
[52] U.S. Cl. ........................................ 74/526; 251/98
[58] Field of Search ................. 74/526, 523; 173/170; 251/95, 96, 98, 99

[56] References Cited

U.S. PATENT DOCUMENTS

| 1,860,872 | 5/1932 | Price et al. | 251/95 |
| 2,512,312 | 6/1950 | Deardorff et al. | 251/96 |
| 2,678,147 | 5/1954 | Abplanalp | 251/95 |
| 2,917,944 | 12/1959 | Hills | 74/526 |
| 4,016,684 | 4/1977 | Urda | 74/526 |

*Primary Examiner*—Kenneth Dorner
*Attorney, Agent, or Firm*—Stephen J. Rudy

[57] ABSTRACT

A safety throttle lever for use on hand-held tools which lever has two operational modes, the first a tool non-operating mode, the second a tool operating mode. Cam-like means are arranged to restrict and guide the lever into the second operational mode when manual effort is applied to the lever. A spring means returns the lever to first operational mode when manual effort is released on the lever.

9 Claims, 8 Drawing Figures

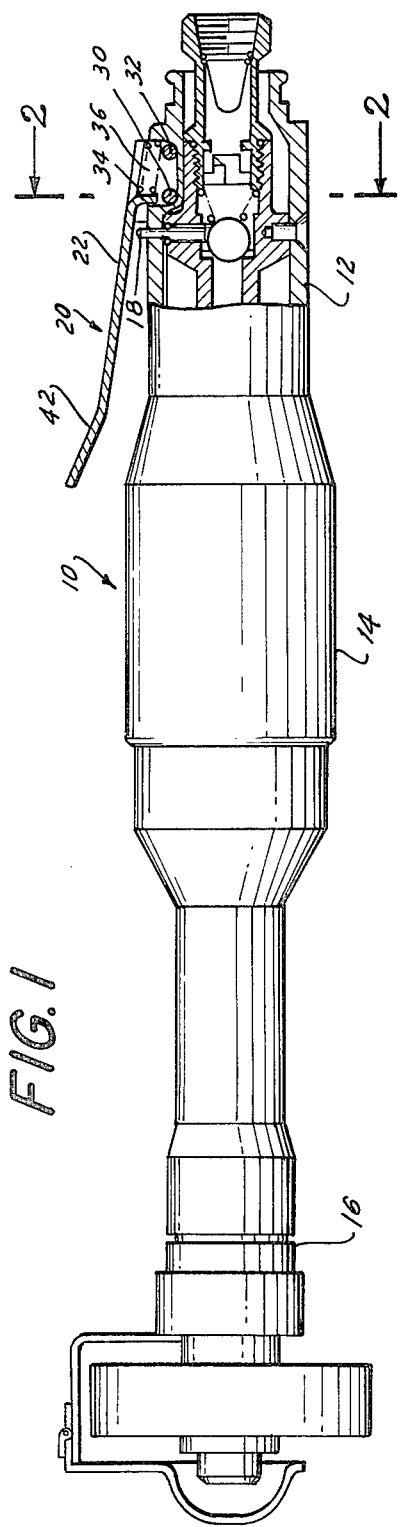
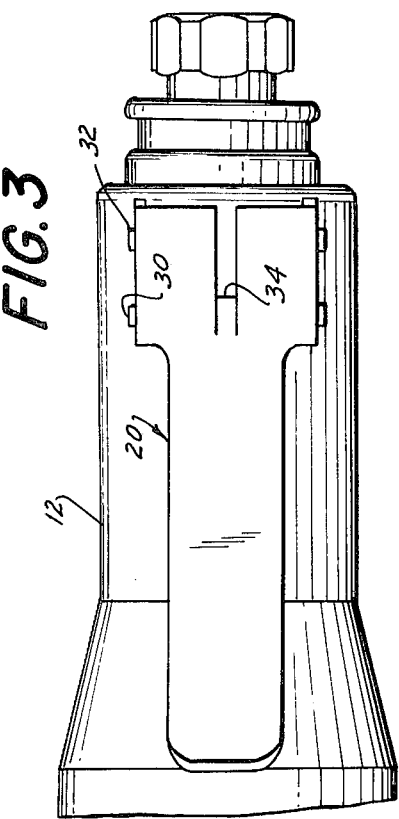
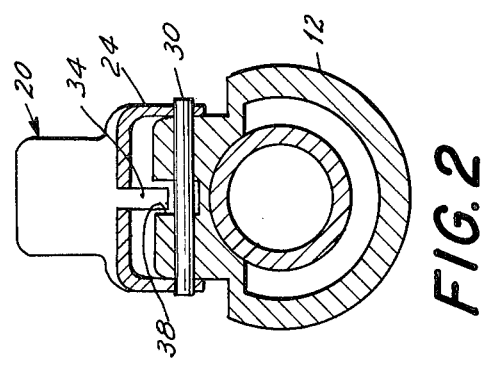

SAFETY LEVER

BACKGROUND OF INVENTION

This invention relates to an improvement in safety levers for use on hand-held tools.

Certain hand-held tools, such as pneumatically powered grinders, can be extremely hazardous when the throttle valve is accidentally or carelessly depressed to initiate tool operation, especially if the tool is not being held firmly by the operator.

Various types of safety levers for use on such tools have been proposed, some of which have gone into use with varying degrees of effectiveness for accomplishment of the intended purposes.

SUMMARY OF INVENTION

The safety lever of the subject invention represents an improvement over known tool safety levers of the prior art. It satisfies the first objective of such safety levers, namely, a fail-safe feature whereby the lever cannot be accidently or carelessly operated when the tool is not being firmly held by the operator. However, it distinguishes over known tool safety levers in its simplicity of design, which not only provides reduced cost manufacture, but operation which is extremely simple in execution and which assures automatic cessation of tool operation when the tool operator releases pressure on the lever.

A distinguishing feature of the safety lever of the invention, is the fact that the lever profile is not encumbered by any protrusion of the safety mechanism, thus avoiding breakage of the safety lever mechanism as a result of tool dropping or impact by exterior forces.

BRIEF DESCRIPTION OF THE DRAWING

FIG. 1 is a longitudinal exterior view, in partial section, of a tool having a safety throttle lever of the invention;

FIG. 2 is an enlarged section view generally as seen along line 2—2 in FIG. 1;

FIG. 3 is a fragmentary view of a top portion of a handle section of the tool of FIG. 1;

DESCRIPTION OF PREFERRED EMBODIMENT

Figure 4:
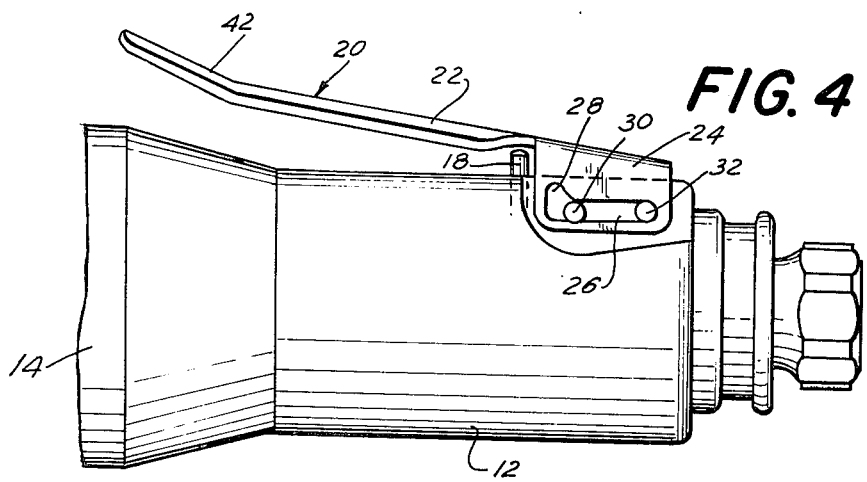
FIG. 4 is a side view of the same and showing the safety throttle lever in tool non-operating position.

Referring now to FIG. 1, numeral 10 identifies a pneumatically powered hand-held grinder of the type well known in the art. While a straight line grinder is illustrated, it will be apparent that the safety lever of the invention could be applied to any hand-held tool pneumatically powered, wherein the safety feature of the invention could be advantageously used.

The grinder has a handle portion 12, a motor portion 14 and an abrasive wheel portion 16. Projecting from the handle portion is a throttle valve stem 18, forming part of a throttle valve arrangement used to control flow of compressed air for operation of the tool. When the stem 18 is depressed it opens the throttle valve for tool operation; when the stem is free of pressure, the throttle valve is automatically closed to terminate tool operation, with the valve stem 18 returning to its original projecting position as shown.

A throttle valve lever 20 is mounted upon the handle portion 12, one portion 22 being elongated and extending in the direction of the motor portion 14. The elongated portion is generally flat and is arranged to contact the valve stem 18 so that it can be depressed to cause tool operation. A mounting portion of the lever is shaped with a parallel side portion 24 which straddle a part of the tool handle portion 12, as best seen in FIG. 2.

Figure 5:
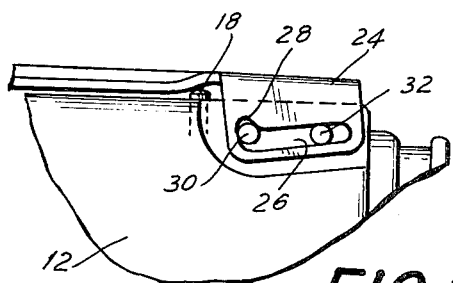
FIG. 5 is a portion of the view of FIG. 4 and showing the safety throttle lever in tool operating position.

Primary cam means are provided in the side portions which cam means include a longitudinal slot 26 extending substantially the full length of the side portion. The forward end of each slot, has an upwardly extending notch 28, forming a secondary cam means. Two pins 30 and 32 are mounted in the handle portion 12 and are arranged to functionally cooperate with the cam means. The ends of each pin extend into the slots 26. In nonoperative condition of the tool, the pins 30 and 32 prevent pivotal motion of the lever, but allow sliding movement of the lever. When the lever is moved rearwardly, pin 30 will be in alignment with the notch 28, allowing pivotal movement of the lever about pin 32, and causing depression of the valve stem 18, as seen in FIG. 5.

The lever 20 is formed with a downward tab 34 which serves as an abutment for one end of a spring 36. The spring 36 is positioned in a cavity 38 formed in the handle portion, and is compressurely arranged in the cavity. It will be seen that the spring functions to return the lever to non-operating position, FIG. 1, when manual pressure is released on the handle. The throttle valve lever thus is arranged for two operating modes, namely, the non-operating mode of FIG. 1, and the operating mode of FIG. 5.

Figure 6:
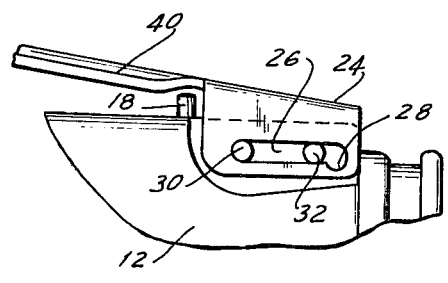
FIG. 6 is a modified arrangement of the safety throttle lever of FIG. 5.

A modified form of throttle valve lever 40 is shown in FIG. 6. The lever 40 is identical in all respects with the valve lever 20, except that the notch 28 is placed at the rearward end of the slot 26 instead of at the forward end, as in lever 20. Accordingly, movement of the lever will be in a forward direction, whereupon the lever will pivot about pin 30, and 32 will be in alignment with the notch 28, to cause depression of the valve stem 18.

The forward end of the lever has an upturned portion 42 to provide an abutment-like means for the operator's thumb to assist in lever movement.

Figure 7:
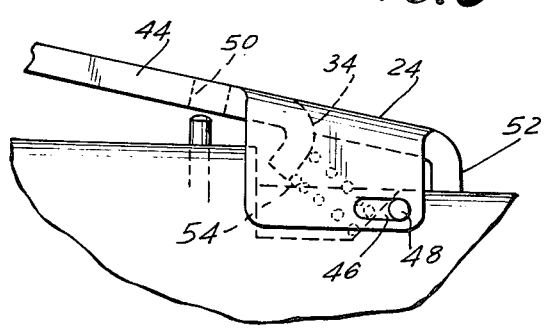
FIG. 7 is another embodiment of the safety throttle lever of the invention showing a portion of the lever in tool non-operating position.
Figure 8:
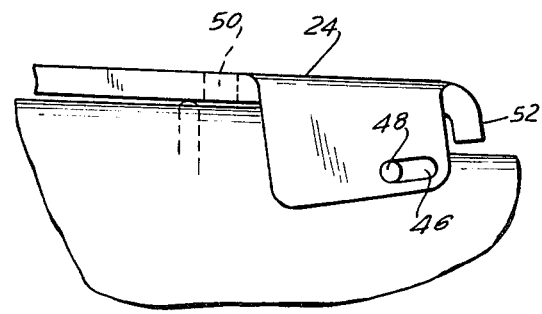
FIG. 8 is the same but showing the safety throttle lever in tool operating position.

A further embodiment of the invention is illustrated in FIGS. 7 and 8. The lever 44 shown therein is similar to the levers hereinbefore disclosed except for two differences. Lever 44 has a slot 46, and a single pin 48 about which the lever can pivot. A hole 50 is formed in the lever which hole will be in alignment with valve stem 18 when the lever is in non-operative position, as shown in FIG. 7. Upon manual movement of the lever in the rearward direction, the hole 50 will be out of alignment with the valve stem 18, and downward movement of the lever will cause the solid portion of the lever to contact the valve stem and move it downward, as seen in FIG. 8, to open the throttle valve and initiate operation of the tool. The lever 44 has a downwardly projecting portion 52 which is arranged to abut the handle portion 12 to limit pivotal movement of the lever about the pin 48, as seen in FIG. 7. A spring 54 is compressively arranged to move the lever to non-operative position when pressure is released upon the lever, as in the case of spring 36 of the first embodiment.

While the invention has been disclosed for use on a pneumatically powered hand-held tool, it will be apparent that it could be effectively applied to other tools, or devices wherein a similar safety problem exists, and could be used on tools which are hydraulically or electrically powered.

What is claimed is:

1. A safety throttle lever for use on hand-held tools, said lever being arranged for two operational modes, the first a tool non-operating mode, the second a tool operating mode wherein a throttle valve of the tool is activated, primary means to allow longitudinal movement of said lever by manual pressure while maintaining tool first operational mode, said primary means including a means having longitudinal slots formed on the lever and pin means for engagement by said slots, and secondary means to allow tool second operational mode after a given amount of lever longitudinal movement, said secondary means comprising notch means formed at an end of said longitudinal slots.

2. A safety throttle lever according to claim 1, wherein means are arranged to move the lever from second operational mode to first operational mode when manual pressure on the lever is released.

3. A safety throttle lever according to claim 2, wherein the means to move the lever from second operational mode to first operational mode when manual pressure on the lever is released comprises a spring compressively arranged between an abutment formed on the lever and an abutment formed in a spring accomodating cavity in a handle portion of the tool.

4. A safety throttle lever according to claim 3, wherein said pin means are mounted transversly in the handle portion, said secondary means including notches connecting with the longitudinal slots, said notches being arranged for engagement with one of said pin means.

5. A safety throttle lever according to claim 4, wherein the lever moves pivotally about a second of said pin means when the notches are engaged with the first of said pin means.

6. A safety throttle lever according to claim 5, wherein said slots are formed in parallel side portions which extend downwardly and straddle a part of the tool handle portion.

7. A safety throttle lever according to claim 3, wherein the lever is provided with a hole large enough to receive an end of a throttle valve stem, when the tool is in the first operational mode.

8. A safety throttle lever according to claim 7, wherein the pin means is formed of a single pin mounted transversly in the handle portion.

9. A safety throttle lever according to claim 8, wherein a projecting portion is formed on an end of the lever, which projecting portion is arranged to engage the handle portion and limit pivotal movement in one direction about the pin means.

* * * * *